United States Patent [19]
Pryor

[11] 3,843,261

[45] Oct. 22, 1974

[54] METHOD AND APPARATUS FOR ANALYZING THE SPATIAL RELATIONSHIP OF MEMBERS

[76] Inventor: Timothy R. Pryor, 5423 York Ln., Bethesda, Md. 20014

[22] Filed: Feb. 2, 1973

[21] Appl. No.: 329,121

[52] U.S. Cl.............................. 356/111, 356/159
[51] Int. Cl. .............................................. G01b 9/02
[58] Field of Search .......................... 356/106–113, 356/156, 159, 169; 250/219 TH; 73/174, 175, 105

[56] References Cited
UNITED STATES PATENTS

| | | | |
|---|---|---|---|
| 3,518,007 | 6/1970 | Ito | 356/108 |
| 3,518,441 | 6/1970 | Selgin | 250/219 TH |
| 3,658,429 | 4/1972 | Zipin | 356/169 |

Primary Examiner—Ronald L. Wibert
Assistant Examiner—Conrad Clark
Attorney, Agent, or Firm—Larson, Taylor & Hinds

[57] ABSTRACT

Methods and devices for producing a two-dimensional diffraction wave interference pattern corresponding to the value of one or more variables at different spatial positions, together with means by which the relative and absolute values of the variables at each position may be obtained.

One embodiment involves analysis of the spatial relationship of a plurality of first points relative to a plurality of second points using a plurality of discrete diffraction wave interference patterns. In another embodiment, the thickness of a moving sheet is determined by forming a discrete interference pattern.

24 Claims, 9 Drawing Figures

PATENTED OCT 22 1974  3,843,261

METHOD AND APPARATUS FOR ANALYZING THE SPATIAL RELATIONSHIP OF MEMBERS

BACKGROUND OF THE INVENTION

U.S. Pat. application Ser. No. 253,421, filed May 15, 1972, by Timothy R. Pryor describes "Diffractographic" and other related means of determining changes in separation between two objects, while continuation-in-part Ser. No. 256,099, filed May 23, 1972 by Timothy R. Pryor now U.S. Pat. No. 3,797,939, describes a means of diffractographic profile measurement where positions of two locations on an object boundary are compared with one or more positions on a reference boundary. In the latter application, a means for producing a unique two-dimensional diffraction wave interference pattern whose distribution is proportional to the profile of the object boundary is described. This application describes the generation and utilization of a similar two-dimensional pattern produced, however, by discrete sensing elements. Use of such discrete elements allows determination of a wide range of industrially important contours as well as the distribution of physical or electrical variables in an array.

This invention has application in many diverse fields, and some of the present problems in each are now discussed.

In the field of profile and contour measurement of objects such as turbine blades, gear teeth, pump impellers, dies, and the like, no technique has in general existed heretofore which can give a high accuracy, high magnification, visual or automatically interpretable view of the whole contour, or deviations therefrom. Therefore, using present techniques, one must either drag a sensing element, such as an electronic sensor or mechanical dial gage, accross the contour, or use a multiplicity of widely spaced sensing elements to give a rough approximation which is often insufficient.

Measurement of coating and sheet thicknesses is of considerable importance to the film, metals processing, plastics conversion industries, and few, if any, present techniques exist which can do so "on-the-fly" to the accuracy required. Of these, none allows low-cost, reliable measurement at a multiplicity of positions across the sheet — a very desirable feature.

In the field of measurement of physical variables, it is often of interest to sense the values of a variable at a multiplicity of points in a variable field such as a pressure or temperature field. To do so using present techniques generally requires a separate sensing element and electronic amplification channel for each position sensed — a complicated, expensive proposition in many cases. In addition a visual display of the information obtained requires further apparatus.

In optical character recognition and other fields it is often necessary to process the data from an array of sensors to determine if a particular distribution of values is present. Such data is presently processed by computers of the analog or digital type, which are in general expensive and in the analog case, difficult to reprogram for different distributions.

Accordingly, it is an object of the invention to provide means by which object contours may be determined in a highly accurate, stable manner, producing a visually or otherwise interpretable interference pattern related to the contour tested.

It is also an object of the invention to provide means of determining thickness at a multiplicity of discrete positions across a moving sheet of material.

It is another object of the invention to provide a means of producing an interference pattern proportional to the distribution and magnitude of physical and electrical variables at various locations in an array.

Finally, it is an object of the invention to provide data processing means by which the relative magnitude of various sensed values may be determined.

BRIEF SUMMARY OF THE INVENTION

These and other objects which will be apparent to those of ordinary skill in the art are achieved according to the present invention by providing a method of analyzing the spatial relationship of a plurality of first points relative to a plurality of second points including providing a plurality of first, discrete, diffraction wave producing means to establish the plurality of first points, providing at least one second diffraction wave producing means spaced from the plurality of first diffraction wave producing means to establish the plurality of second points spaced from the first points, and directing electromagnetic radiation at the first and second diffraction wave producing means to form a plurality of discrete interference patterns each caused by the interaction of waves produced from one of the first diffraction wave producing means forming one of the first points and from the second diffraction wave producing means forming the second point spaced from the one first point. The diffraction wave producing means each comprise a boundary capable of producing a single diffraction wave upon incidence of the electromagnetic radiation. A single boundary, or two or more boundaries may be employed for each diffraction wave producing means. Where a plurality of boundaries are used, such as in a diffraction grating, the boundaries are spaced in a direction transverse to the direction of electromagnetic radiation.

Apparatus useful for practicing the method according to the invention includes a plurality of first, discrete, diffraction wave producing means for establishing the plurality of first points, at least one second diffraction wave producing means spaced from the plurality of first diffraction wave producing means for establishing the plurality of second points spaced from the first point, and means for directing electromagnetic radiation at the first and second diffraction wave producing means for forming a plurality of discrete interference patterns each caused by the interaction of waves produced from one of the first diffraction wave producing means forming one of the first points and from the second diffraction wave producing means forming the second point spaced from the one first point.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

Figure 1:
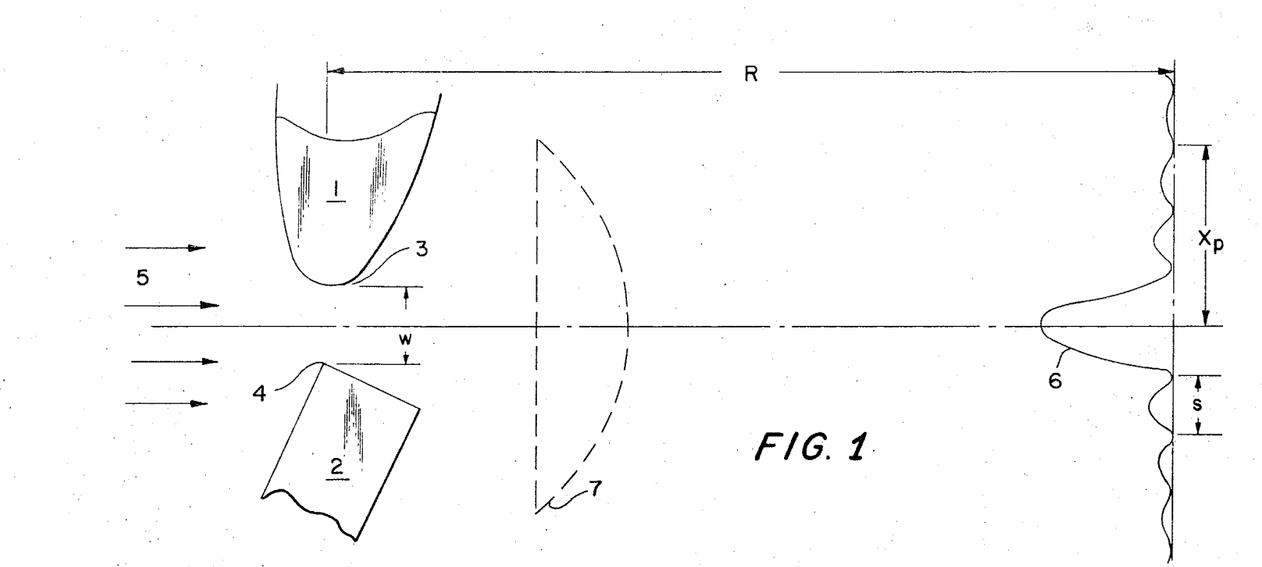
FIG. 1 is a diagrammatic side elevation of one embodiment of the basic displacement sensing method of application Ser. No. 253,421.

Application Ser. No. 253,421 describes a means for sensing changes in separation between objects, utilizing interference patterns generated by diffraction waves. For reference and illustration purposes, a typical example is shown in FIG. 1 wherein it is desired to measure the displacement of member 1 relative to member 2. Using, in this example, the edge boundaries 3 and 4, respectively, of the members as the diffraction wave producing means, the two members are located such that the edges are separated by a distance $w$. Upon illumination by monochromatic electromagnetic waves 5, a wave is diffracted from each edge boundary 3 and 4, forming an interference pattern 6, at a distance $R \gg w$, or alternatively in the focal plane of optional convex cylindrical or spherical lens 7. This lens may alternatively be located between the radiation source and members 1 and 2.

To summarize very briefly the invention of U.S. Pat. No. 3,664,379, issued May 23, 1972, to Timothy R. Pryor, and U.S. Pat. application Ser. No. 253,421 which is a continuation-in-part of said patent, small changes in $w$ caused by displacements, $\delta$, of member 2 relative to member 1 cause large changes in the spatial positions, $x_p$ of the pattern fringe minima providing a new form of inertialess, high magnification, displacement measurement. Many types of detection and readout means may be used to obtain $\delta$ from pattern fringe movements, and many other diffraction wave producing means can be used, for example, slits in opaque wall members, diffraction gratings, etc. In either of these events, the diffraction wave producing means includes a plurality of boundaries separated in a direction transverse to the direction of the electromagnetic radiation.

The equation relating fringe minima angular position, $\theta$, to separation $w$, is given by $w \sin \theta = n \lambda$, in which in the small angle region ($\sin \theta = \tan \theta$) is approximately, $$w = n \lambda R/x_p \quad (1)$$

where $\lambda$ is the wavelength of radiation employed, $n$ is an integer signifying fringe order number and $x_p$ is the distance from the pattern centerline to the fringe position in question. In FIG. 1, the third fringe minima is chosen.

The inherent magnification is apparent by differentiation of equation (1)

$$\delta = \Delta w = (n \lambda R/x_p^2) \Delta x_p \quad (2)$$

where $n$, $\lambda$, and $R$ are considered as constants. Thus the magnification of displacement (M) of the system is $$M = \Delta x_p/\Delta w = x_p^2/n \lambda R = n \lambda R/w^2 \quad (3)$$

At visual wavelengths, $R \lambda$ is typically 1mm$^2$, and if $w = 0.05$ mm, $M = 400n$ which is a high value for practical optical systems, particularly when higher order numbers $n$ are used. Because of this high magnification and the nearly symmetric intensity distribution of the individual fringe minima regions, small changes in $w$ are easily determined.

This application concerns a new and useful method and apparatus utilizing an array of discrete sensing elements, similar to that described relative to FIG. 1 above, to produce a set of discrete interference patterns. The first class of embodiments to be described (relative to FIGS. 2–5) are those referred to in the art as multipoint gages or conformators. Examples of each apropos to this application are Walter, U.S. Pat. No. 1,364,534 and English, U.S. Pat. No. 3,483,629. As will be shown, the disclosed invention, when applied to this class of apparatus, offers a quantum jump in the ability of such devices to easily detect small differences in contour dimension.

Figure 2:
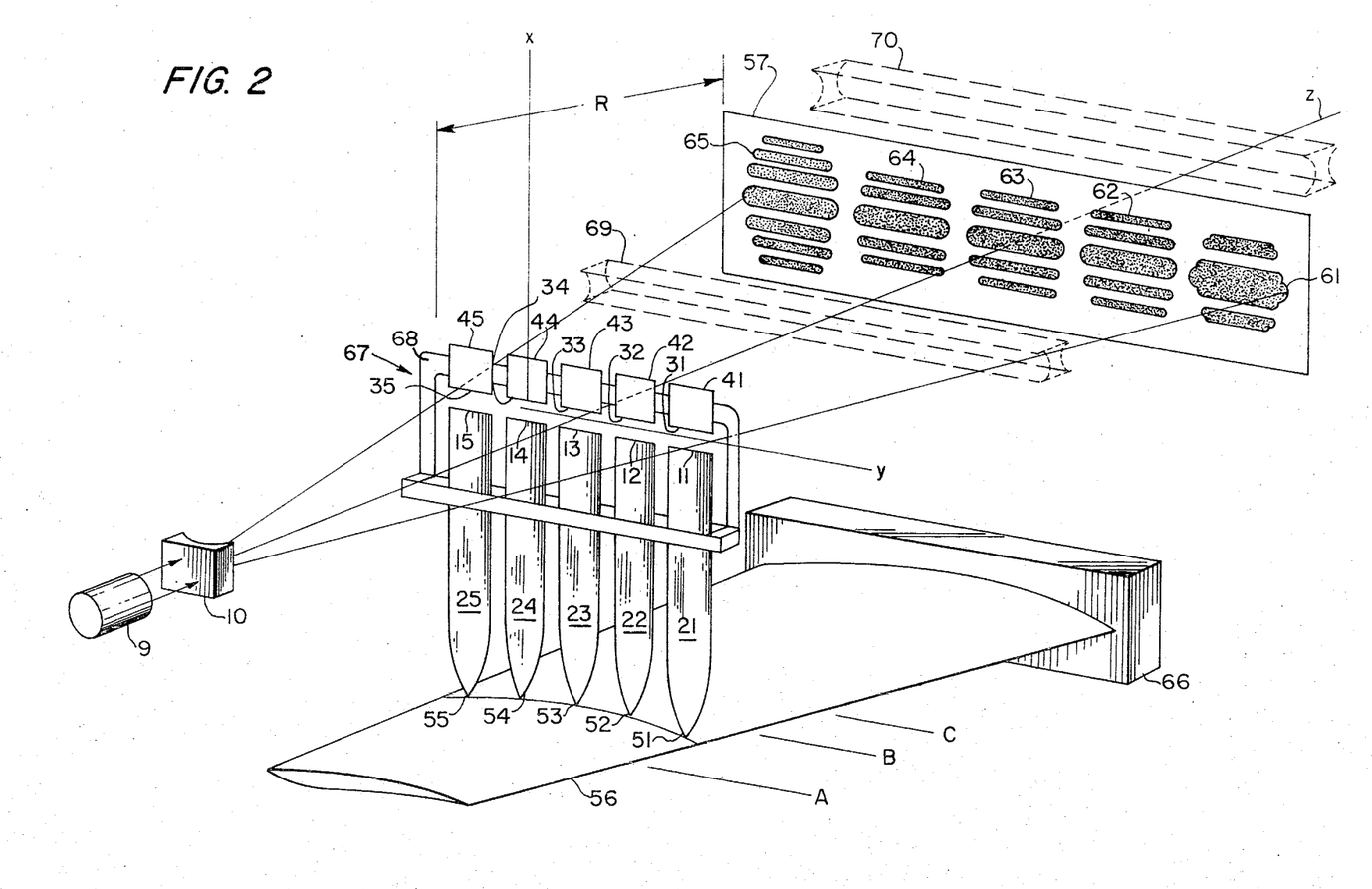
FIG. 2 is a diagrammatic perspective view of an embodiment of the invention producing a line array of discrete interference patterns whose distribution is indicative of differences in contour of a tested member relative to a master.

FIG. 2 illustrates a multipoint gage embodiment of the invention in which a TEM$_{oo}$ He-Ne gas laser, 9, produces space coherent and monochromatic electromagnetic radiation of wavelength, $\lambda$, equal to 0.6328 micrometers, which is spread in a fan by cylinder lens, 10, to illuminate a line array of five pairs of diffraction wave producing means, comprised in this example by edge boundaries 11 to 15 of elongate "pin" members 21 to 25 and colinear reference edge boundaries 31 to 35, of members 41 to 45, parallel to edges 11 to 15, respectively. The opposite ends 51–55 of the pins 21-25 contact the measured object, in this case a turbine blade 56, with the consequence that the separation, $w$, between each pair of opposite pin and reference member edges is a function of the contour of the turbine blade surface when the references edges are fixed in space as shown.

On a ground glass screen, 57, a distance R much greater than $w$, or at the focus of an optional cylinder lens as illustrated by member 7 in FIG. 1, individual Fraunhofer type interference patterns 61 to 65 are formed by the coherent interaction of diffraction waves from each pair of opposite parallel edges. As has been discussed above, as well as in the referenced patent applications, the difference between like orders of two adjacent interference patterns fringe minima positions, $(x_p)_i$ and $(x_p)_j$, is:

$$(x_p)_i - (x_p)_j = nR\lambda(1/w_i - 1/w_j) = nR\lambda\,(w_j - w_i/w_i\,w_j) \quad (4)$$

It is noted that $(x_p)_i$ and $(x_p)_j$ are relative to the same base line only when the optional cylinder lens 10 is used to form the patterns, since $x_p$ for each slit is measured relative to a line in the $z$ direction midway between its edges, and the center lines are not, in general, coplanar in the apparatus of FIG. 2. However, the error encountered if the coplanar assumption is made with no lens system is usually negligible.

The position of a corresponding point on the object, $x_i$, relative to another, $x_j$, is expressable as:

$$x_i - x_j = (w_j + h_j) - (w_i + h_i) \quad (5)$$

when reference edges for both positions $i$ and $j$ are parallel to the $yz$ plane, where $h_i$ and $h_j$ are the respective pin lengths. For the case $h_i = h_j$, equation (5) becomes $$x_i - x_j = w_j - w_i \quad (6)$$

Substituting equation (6) into equation (4) gives $$(x_p)_i - (x_p)_j = n\,R\,\lambda\{(x_i - x_j)/[w_i^2 + w_i\,(x_i - x_j)]\} \quad (7)$$

Thus the change in contour dimension between two points on the object $x_i - x_j$ is related by a non-linear function (7) to the change in fringe position $x_p - x_p$ between the inteference patterns corresponding to the same locations on the object, produced by the apparatus of FIG. 2.

In practice, one "external reference" mode of operation of the FIG. 2 embodiment proceeds as follows. Reference edges 31 to 35, themselves parallel (and often colinearly comprised by a single elongate straight edge) are mechanically positioned in fixed position such as parallel to an external reference line of the object, in this case the base 66 into which the tested turbine blade root fits. The sensing array 67 comprising housing 68, pins 11-15 and members 41-45 is then lowered, while maintaining this parallel condition until all pins are in contact with the turbine blade surface. Using some position, say the end or number 21 pin as a reference position, the array 67 is further lowered until the discrete interference pattern 61 produced by the invention at that position reaches a predetermined condition, for example a certain value of $x$ of the first order minima, or a certain fringe spacing, $s$, where $s = R\lambda/w = x_p/n$.

Knowing in advance, the value of $w$, or calculating it using equation (1), equation (7) may be used to determine the contour of the object relative to the reference position.

In the FIG. 2 apparatus, details of housing, 68, have been omitted for clarity. It is understood however, that this housing forms a rigid mounting for the reference edge members 41 to 45, and secures the pins in a coplanar line array, allowing their movement essentially in one direction only (the $x$ direction). Limit stops, also omitted for clarity, keep the pins from falling out of the housing as it is transported in preparation for contact with the object surface.

In a manner similar to equation (3), magnification can be written as $$M = [(x_p)_i - (x_p)_j]/(x_i - x_j) = nR\,\lambda/[w_i^2 + w_i\,(x_i - x_j)] \quad (8)$$

from equation (7). For small variations in contour, i.e., $(x_i - x_j)$ small, M is approximately equal to $nR\lambda/w^2$, from equation (8). Even when the first order ($n = 1$) is used, $M$ can therefore be as high as 800, when values of $w = 0.05$ mm, and $R\lambda$ of 2 mm² are used.

The high magnification obtained, without any optical aberation or complexity, along the whole contour or interest, constitutes the primary advantage of the system. However, the range of values of $(x_i - x_j)$ at which such magnifications may be obtained is limited, as apparent from equation (7). For example, if the contour was to vary such that $(x_i - x_j)$ was 1mm, magnification would fall to about 40.

Since most objects have contour deviations from linear far in excess of even 1mm, the usual mode of operation is as a comparison measurement against a master contour. This is accomplished in the FIG. 2 apparatus by making each pin length, $h$, such that when a "perfect" object contour is measured, all $w$ values at positions corresponding to pins 21 to 25 will be identical. This can be done by manufacturing the pins the correct length from specifications or by setting up adjustable length pins when positioned against a "master" object.

An alternative way of achieving a constant $w$ "master condition" is to use reference edges which are parallel, but not colinear in conjunction with pins of equal or arbitrary length, $h$. When an optional lens such as 7 is used to provide the Fraunhofer condition the resulting pattern obtained by positioning the reference edges to achieve constant $w$ at all pin positions is the same as obtained in the FIG. 2 apparatus using mnufactured to-length pins and a single straight reference edge for all positions or alternatively individual colinear reference edges. The advantage of using adjustable position reference edges is that the apparatus may be set up for different contours without changing pins, such set up being accomplished rapidly over short ranges by using precision electrical actuation elements such as piezoelectric bulk expanders or bimorphs to move the individual reference edges. A "replaceable reference" embodiment is discussed relative to FIG. 5.

When visual detection of pattern fringe positions differences is used, as in FIG. 2, the comparative system described above functions very well indeed, as the eye can rapidly scan the array of individual patterns 61-65, whose fringes are side by side in a straight line when the contour equals the master. Any deviation is immediately picked up by the eye as deviation from straightness and the amount of deviation, $[(x_p) - (x_p)\text{ master}]$ can be measured, using a superposed template on the screen or other distance measuring means. The contour dimension error, $\Delta x$, may be determined using equation (7), where, in this case, $x_i$ is the master dimension and $x_j$, the actual dimension, at the position in question.

If adjustable reference edges are used, it is also possible to determine a change in $x$ by moving the reference edge a known amount until $w$ is such that fringe position $s$, corresponds to that produced by the master. The known distance moved gives the out-of-tolerance value, $\Delta x$, directly.

Many other techniques may be used to determine $\Delta^x$, and a good discussion appears in application Ser. No. 253,421. It is of interest here to concentrate more on the employment of the compsite contour pattern apparatus and variation therein.

When utilized visually as shown, it is generally confusing for an operator to use order numbers greater than $n = 1$ or 2, and magnification is therefore limited unless large values of $R$ can be used, recognizing that must be in the visible range and $w$ at any position must usually be in excess of 0.05mm if meaningful measurements are to be made at that position.

To allow for higher magnification, two expedients may be used. The first and easiest is to magnify the pattern observed using a simple cylindrical lens system. For example an optional cylindrical diverging lens, 69, placed a distance from the array 67 such that the Fraunhofer pattern is sufficiently formed, can be used to magnify the first order projected on screen 57 by ten times or more, effectively increasing R by the same amount in equation (7). Alternatively, optional positive cylinder lens, 70, may be used to magnify the pattern observed on the screen. In fact the two lenses in combination can achieve 50X magnification of $\Delta x_p$, and thence 50M of $\Delta x$.

A technique which avoids the idiosyncrasies of lens systems is to use a light source containing two or more selected wavelengths. For example, if a He Ne laser ($\lambda = 6,328$ A) and Argon laser ($\lambda = 4,880$ A) are arranged using a beam splitter such that their output beams are colinear, the interference patterns produced by each wavelength will be coincident, with the first black fringe to be distinctly visible occurring where the seventh 6,328A order and the ninth 4,880A order approximately coincide. Thus $N = 7$ of the He Ne laser is usable in a non-confusing manner, allowing 7x improvement in magnification over the usual $n = 1$ case, by equation (7). Used in conjunction with the cylinder lens magnification systems mentioned above, total magnification improvements in excess of 300 times may be obtained over that usable in a non-confusing manner with a single wavelength and no lenses.

There are many variations on the construction of the "pins," which may be of any practicable cross section, not just the rectangular strips shown in FIG. 2. For example, while it is generally preferable that all reference and pin edges are coplanar, this is not necessary. Not only may the reference edge-pin edge pairs be staggered in the direction of the incident radiation or $z$ direction, but the pin edges may be staggered relative to the reference edges as well, giving rise to "z-factor" effects discussed in Ser. No. 253,421. Furthermore, pin contact points with the objects may be staggered if desired.

The FIG. 2 apparatus utilizes gravitational force to keep the pins on the object, with a slip fit between adjacent pins. Many other possibilities exist, however. For example, air pressure, magnetic, or electrostatic forces, and elastic spring members may also be used to provide contact forces.

While generally preferable for alignment and other purposes, it is not necessary that the reference edge(s) or other reference diffraction wave producing means be attached to the housing 68 containing the pins. For example, in the FIG. 2 situation, the reference edges could be permanently located relative to the turbine blade base 66 acting as an external reference.

The pins do not have to be elongate linear members as shown in FIG. 1, and a mechanical magnification or demagnification of the value $\Delta x$ is possible if the pin contact and pin edge pivot around a fulcrum. Clearly other mechanical multiplication systems can be employed as well.

Many variations in the design of the pin bearing surfaces are possible. They can roll on ball or roller bearings, on air or liquid film bearings, slide next to each other with a teflon interface, etc. In act, the pins can themselves be made of teflon or some other low friction coefficient material.

While only five pins are shown in FIG. 2, it is obvious that many more could be employed. In fact, this is one of the great advantages of the invention, that a very large number of positions can be accurately monitored for very little cost. In a similar vein, the pins may be very small, allowing a high packing density. For example, 100 positions may be monitored across a turbine blade section only 5 cm long. Such a performance is impossible using present techniques of even remotely similar accuracy.

Presently a single section contour of a turbine blade is typically monitored at three positions using, 0.002 mm graduated dial gages, with very little improvement possible. Thus, to obtain contour at all points on the contour, a high resolution mechanical or electronic displacement sensor must be dragged in a line across the surface — a much less desirable alternative to the instantaneous display possible with the invention here described.

Another very important advantage of the disclosed invention is that a minimum of contact pressure is required. Because the diffractographic technique is non-contacting, the only force required is that necessary to assure contact with the object. This is in contrast to the vast majority of other sensors which require far more contact pressure for their operation, leading to sensing erros, particularly on soft materials.

When the pins are not located immediately adjacent each other, the boundaries of the pin shafts are also illuminated in some embodiments. The resulting radiation diffracted however, is not generally bothersome, and in any case may be blocked off by suitable masks.

The pins shown in FIG. 2 employ a point contact with the object. If minimum indentation is required, a much larger radius-contact may be used. On the other hand, a unique "contour hardness tester" results if all pins have a uniform or known force applied and the depth of identation is the desired answer.

Another consideration regarding the pins is that they may be made buoyant, to float on a fluid rather than rest on a solid (or on a liquid by surface tension). Thus liquid level or density contours may, for example, be determined using the invention.

Where the tested object surface and the pins are electrically conducting, a completed electrical circuit can signify that each pin is in contact with the object, an important consideration if very light pin pressures are used.

Several other considerations regarding optical arrangements are in order. First, it is not at all required to use a visible light gas laser, as any suitable electromagnetic wave source will do. However, the visible light gas laser is the preferred source, having excellent spatial and temporal coherence and high power density, while allowing a wide variety of visual and photo detection systems to be used.

Cylinder lens 10 may be replaced by a scanner, which if fast enough, can produce what appears to the eye as a stationary pattern. Use of a scanner has an advantage, in that it allows light to be concentrated, if desired, at any particular pin location, providing a more intense interference pattern and allowing more accurate determination of fringe position $x$, for the location in question.

As disclosed in U.S. Pat. application Ser. No. 257,801, filed May 30, 1972, a single boundary may be used to generate both interfering diffraction waves. Using the aforementioned invention it is therefore possible to replace either of the edge boundaries in FIG. 2 by a plane mirror. Twice the sensitivity (i.e., magnification) results.

More important even than the increase in sensitivity, is the ability of a mirror to provide a virtually perfect straight reference without sensitive alignment. This advantage is utilized in the embodiment of FIG. 3, wherein a "conformator" version of the pin array apparatus 67 of FIG. 2 is used to transfer a reading from the turbine blade surface to a remote checking station. Transfer is accomplished by freezing the relative pin locations by means of pin locking and reference bar, 93, or other means well known in the art, and the locked array is then placed on reference "Vee" or gage blocks 94 and 95, usually of equal height, located on flat mirror 96.

Figure 3:
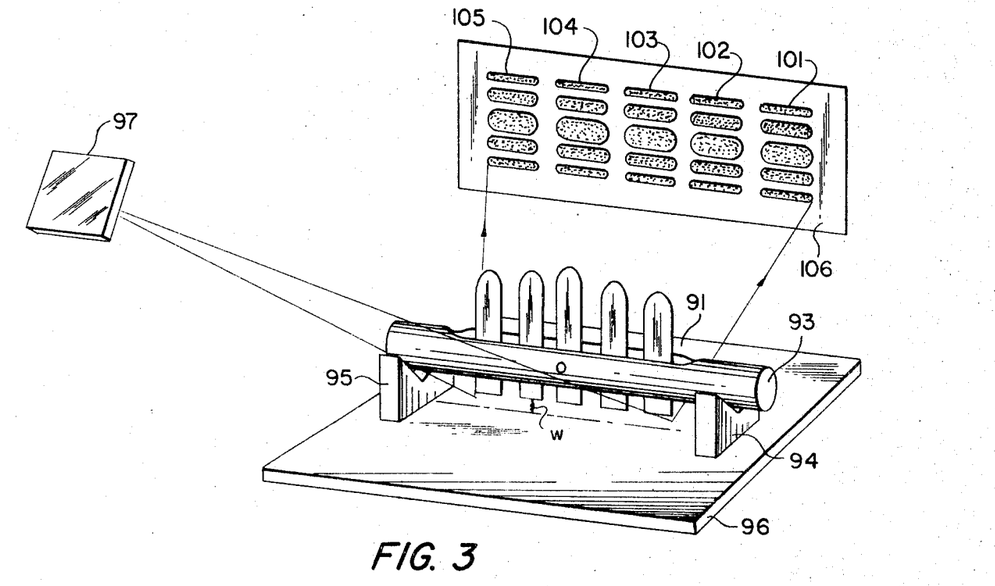
FIG. 3 is a diagrammatic perspective view of a conformator embodiment of the invention for obtaining a transfer measurement and utilizing the "Bounce-off" Diffractographic sensing method.

Denoting the gap between the pin edges and the mirror as $w$, it is apparent that $w$ is a function of the turbine blade contour, as well as the known height of the gage blocks and location of the reference bar 93. When the region of the pin edge-mirror gaps is illuminated by a fan of radiation originating from a laser (not shown) and spreading from cylinder lens 97 and incident to the mirror at angle $\phi$, a plurality of discrete diffraction wave interference patterns 101 to 105 are formed on screen 106 "bounce-offed" the mirror at angle $\phi$ whose fringes behave, in the small angle $\theta$ region, as if they had come from a FIG. 1 type "slit" of width $2 w \cos \phi$. Because mirrors can be manufactured with little difficulty to flatness of $\lambda/20$ or better across their whole face, they may serve as virtually perfect straight line references. Together with the increased sensitivity of the bounce-off technique, this means that previously unobtainable accuracies in determining pin positions, and therefore contours, are possible. In fact, it is at least 10 times better than any known way of obtaining the relative pin locations in a transfer type conformator gage.

A further advantage of using the mirror reference is that unlike the straight edge reference which could have been used in this example, there is no alignment required in the $z$ direction as all diffraction waves come from the same pin edges. $x$ direction alignment is of course performed by the gage blocks which could be made an integral part of the pin array reference bar as well.

Figure 4:
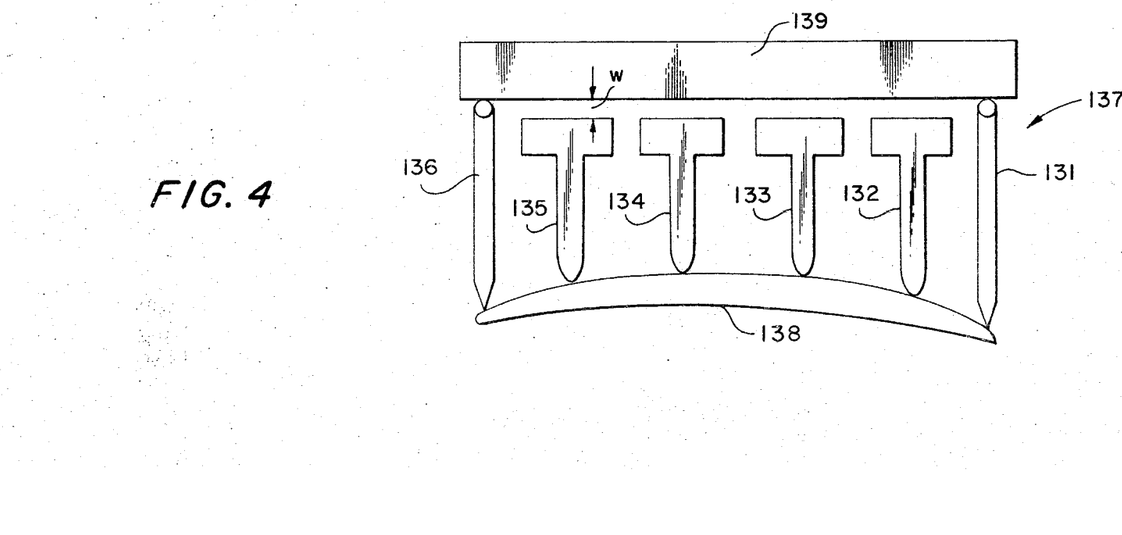
FIG. 4 is a diagrammatic end view of self-aligning embodiment of the invention.

In the end view of FIG. 4, another variation on the FIG. 2 pin array apparatus is shown. In this case a single reference edge is used which is not located relative to an external reference line, but instead to the positions of two pins. As shown, the elongate pins 131–136 in pin array 137 contact the turbine blade 138 and single reference edge 139 contacts the tops the extreme pins 131 and 136 which do not have diffracting edges. Contact between pins 132–135 and blade 138 is maintained by spring loading or other suitable means (not shown).

When this array is placed on the turbine blade surface, the reference edge is automatically aligned with respect to two object positions, in this case those near the edges of the object. This automatic alignment is of considerable advantage if there is a possibility of placing the object in contact with the pin array in such a manner that the object reference line is skewed relative to the line of the reference edge(s).

Clearly, the pins could be locked with the contour encoded as separations $w_i$ and the array moved to a separate reading location containing the wave source and readout system.

In the previous examples, measurement of object contours deviating more than 1mm or so was made by adjusting or manufacturing the pins to some master length, generally different for each pin.

However, suppose it is desired to check an objects contour at several sections, for example A, B and C on the turbine blade of FIG. 2. If the object is of constant section, the original pin master lengths suffice at all sections and the same pin array may be used at each. If however, the contour of the object differs at each section, as in the turbine blade example, then the pin lengths must be changed at each section, if the easy-to-visualize straight fringe pattern is to be used.

Such a pin length change can of course be accomplished by mechanical adjustment, replacement or other means but it is generally easier to change the reference edge position to maintain some master $w$ value at each pin location while traversing from section to section.

Figure 5:
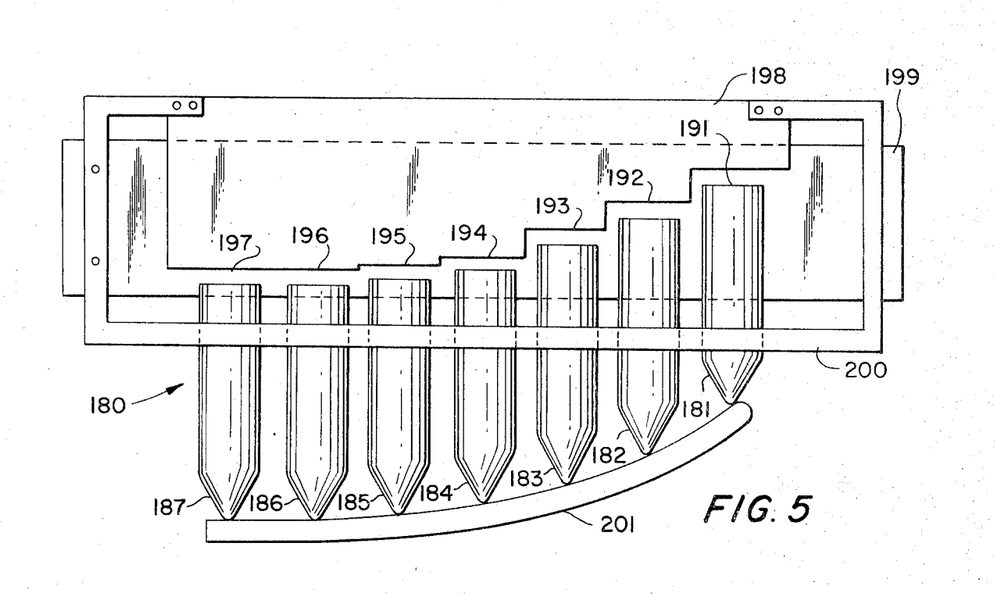
FIG. 5 is a diagrammatic end view of a replaceable reference member embodiment of the invention having non colinear reference edge boundaries.

Consider the pin array apparatus 180, similar to that of FIG. 5, comprising individual pins 181 to 187 each with parallel edges on one end placed relative to edges 191 to 197 of replaceable reference edge member 198, together with cylinder lens 199, and housing, 200. The pins are the same length, $h$, and have been placed in contact using spring loading means not shown for clarity, with the test object, an automobile flex fan blade cap, 201, such that corresponding to the location of pins 187 and 186 which contact a flat portion of the cap section, two equi-spaced interference patterns are produced. Under this condition the stepped reference edge member, 198, is aligned with the flat portion of the blade, as desired.

Since the fan blade cap design calls for a 5mm height above the flat at pin location 187, and all pins are of the same length, it is obvious that the 1mm nominal range of the diffractographic measuring system is exceeded Accordingly, the parallel diffracting edges of member 198 are staggered such that at each pin location an equal separation $w$ occurs for a "perfect" blade cap, when the reference member and cap flat are aligned as previously described. Cylinder lens, 199, similar to the optional lens, 7, of FIG. 1, then forms the interference pattern from each pin location in its focal plane and centered on a line parallel to the cylinder lens axis and co-located in the same plane as said axis ($y$ direction) and the direction of laser beams propagation ($z$ direction).

This centering operation performed by the cylinder lens and producing an aligned array of discrete interference patterns is an important feature, as the patterns would otherwise be staggered in the y direction, a less desirable situation in most cases. Of course if each location's edges were individually illuminated by separate beams, each beam could be inclined such as to produce aligned patterns having a common centerline at a given distance R, without the aid of a cylinder lens. While many other optical arrangements can be used, the easiest is one large radiation beam covering all locations, and a cylinder lens as described.

If the system shown in FIG. 5 is now moved to a section of the fan blade cap having a different contour, it is only necessary to replace master member 198 with one whose edge positions correspond to the new master contour. Such replacement can be very fast and it is important to note that the device may be operated in a transfer mode as discussed relative to FIG. 3, in which the relative pin locations are locked and the array 180 moved to a remote station incorporating a laser, reference member 198, a readout means, and perhaps cylinder lens 199, unless a part of the array.

Clearly, the pin lengths do not have to be all equal for this staggered reference edge version to function properly. For example, the array apparatus of FIG. 2 which has colinear reference edges at Section A could be moved to Section B and a staggered reference such as 198 employed.

The changeable reference edge position function need not be accomplished by mechanical replacement, but may be performed by individually adjusting the position of each edge, for example, with a precision micrometer or rotating cams on a shaft.

Reference edge position can also be changed electrically, for example using piezoelectric elements which expand or deform with applied voltage, Galvanometer movements or the like. Within the accuracy limits possible, such electrical change allows continuous or programmed changes at all locations without physically contacting the array. Virtually continuous sweeps down the object can thus be made.

Figure 6:
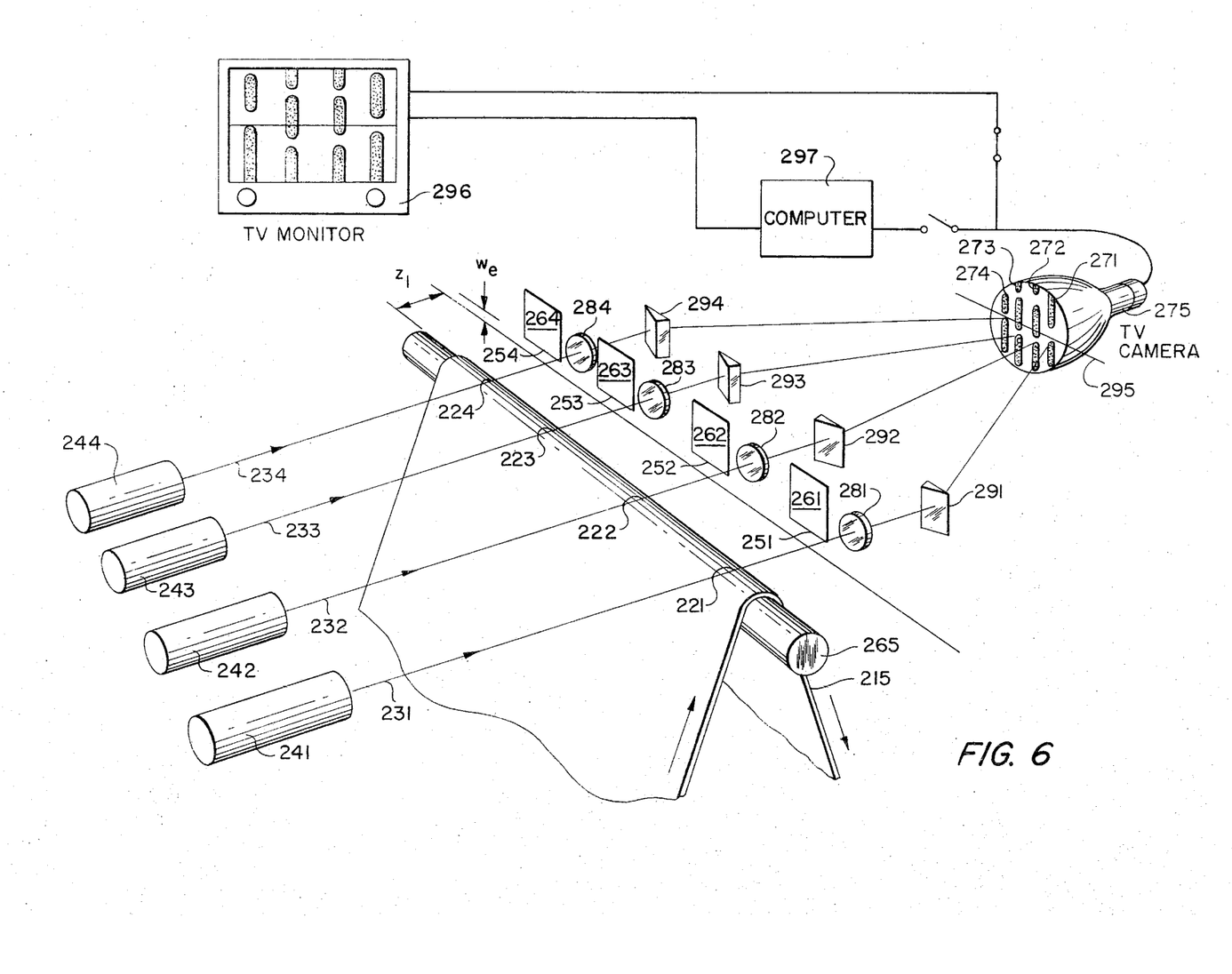
FIG. 6 is a diagrammatic perspective view of an embodiment of the invention utilized for thickness gaging of sheet products.

In each of the above examples a contour array of interference patterns is generated corresponding to the relative distance of an object at several positions from known reference locations. FIG. 6 now illustrates a situation in which discrete portions of the tested object itself act as diffracting boundaries to produce diffraction waves.

Consider the indistrially important problem of determining profiles of moving objects such as extruded bars and tubes or sheet products. Clearly the opposite case to FIG. 5 may be employed whereby the pin array is held stationary and the material scanned passed it. However, even if a rolling pin contact is used, significant vibrational amplitude can be generated which may require complicated damping systems on the pins, stroboscopic illumination of the edges or the like.

In at least one important case however, it is possible to use the boundary of the tested object material itself, rather than the edge of a contacting "pin," as a diffraction wave producing means suitable for the invention.

Considering the apparatus of FIG. 1 which is shown in more detail in application Ser. No. 253,421, it is evident that if a piece of sheet material were wrapped around the surface of object 1, the separation $w$ would decrease by the amount of the sheet thickness. The resulting change in the diffraction wave interference pattern 6 therefore greatly magnifies sheet thickness and the invention therefore makes an excellent sheet thickness monitor, since no contact is made with the sheet by the sensing mechanism. Contact, however, must be maintained against the reference surface such as that of object 1 in FIG. 1, which may be a cylindrical roller normally used in sheet manufacturing processes. The diffraction wave from the sheet is generated at the point of tangency of the incident laser beam with the sheet. In most practical cases, interference occurs with the diffraction wave from a reference edge, such as edge 4 of object 2 in FIG. 1, which is usually located so as to be spaced in the direction of laser beam propagation, or z direction, from the point of sheet tangency. Use of this "Z-factor" arrangement, described in detail in application Ser. No. 253,421 provides clearance and is illustrated in FIG. 6 described below.

This case is illustrated in FIG. 6 where thickness of plastic sheet (or coatings thereon) is determined during a plastics conversion process. In this case, it is very desirable to known thickness at several positions across the sheet so that the amount of plastic added from different valves (also spaced across the sheet) can be controlled. Accuracy requirements (typically $\pm 0.005mm$ or better) are such that no known present system, other than that disclosed in the related application Ser. No. 256,099 can do the job.

As shown, polyethylene sheet 215 is located such that the points of tangency of the sheet, 221-224 to incident electromagnetic radiation beams 231-234 from 1 milliwatt helium neon gas lasers 241-244, generate diffraction waves which interfere with those from reference edge boundaries 251-254 of members 261 to 264 fixed in space relative to the reference roller 265.

The change in separation in w is thus proportional to the thickness of the sheet at each location assuming as is necessary, that the sheet is in contact with the roll and that the roll is straight and running true. For a sheet of uniform thickness this implies that, if the reference edges were adjusted initially to have equal separation from the roller, the interference patterns will all be of equal spacing when the thickness of the sheet is uniform.

In general practice, it is usually much more desirable to locate the reference edge relative to the tangent point of the laser beam on the sheet in the manner shown in FIG. 6. This "Z-factor" - arrangement, disclosed in application Ser. No. 253,421 produces a symmetrical interference patterns whose fringe movements are proportional to $w_e$, the effective slit width in the $(x)$ direction perpendicular to the laser beam. With this arrangement, small values of $w_e$ can be used while maintaining a large clearance dimension (equal to $(w_e^2 + z_1^2)$) required in most industrial situations. Particularly large fringe movements occur on the side of the pattern where the reference edge is located, which in the FIG. 6 example is in the $+x$ direction relative to the laser beam centerline. The amount of asymmetry (and clearance) is dependent on the value of $z_1$, the reference and sheet boundary separation in the z direction, which is usually about 1-4 cm.

In the particular example of FIG. 6, portions of the discrete interference patterns from each sheet location, 271-274, are formed on the face of TV camera tube 275 by means of long focal length spherical lenses 281-284 and wedges 291-294. A fiducial line comprised by wire 295 is placed across the TV camera to delineate typically the first of second order position of all patterns when the sheet 15 of uniform thickness equal to some desired value. In usual practice, the camera tube is allowed to pick up only one or at most two of the minima positions, so that the display on TV monitor 296 is as non-ambiguous as possible.

The interference pattern profile displayed on the TV screen in the example illustrated in FIG. 6, is that caused by a sheet which is too thick (i.e., fringe above fiducial line) at the edges and too thin (i.e., fringe below) in the center. The sensitivity of the system is such that a change in thickness of the sheet (or equivalently of a coating on the sheet) of 0.005 mm will move a fringe 10cm from the fiducial line — a movement easily visualized by a machine operator, and representing a magnification $M = 20,000$. Such magnification is required only in checking very thin plastic or aluminum for six, and considerably less is needed for steel car body sheet, for example, which is made to much coarser tolerances.

In some instances, it is useful to eliminate the optical wedges 291-294, and perhaps the lenses 281-284 as well, both for simplicity and to eliminate the variation in R value caused by the varying focal lenths required in the FIG. 6 apparatus which gives varying sensitivity to changes in thickness at each position. The easiest way is to use a separate TV camera at each location, said cameras scanned only in the vertical (x) direction. Individual self scanning photo diode arrays such as the 256 element Integrated Photomatrix Co. series 7,000 apparatus may also be used.

There are many other optical arrangements which can be used in the sheet checking apparatus. For example, one or more cylinder lenses or flat or curved mirrors may be used instead of the wedges shown. Indeed, no optical parts need be used at all if the lasers are arrayed in an arc such that their individual beams are aimed at the TV camera.

A single laser source may also be used to illuminate all positions using a cylinder lens, as in FIG. 2, or alternatively, using a scanning means to sequentially direct light at each position in turn. In this latter case, all patterns generated can be imaged on to a single onedimensional detector array element; rather than a TV camera, since the laser beam scan rate may be used to drive the TV monitor sweep.

A template can be placed in front of the TV screen to give numerical indications of the thickness or out of tolerance condition at each location. This template can also be generated by an optional separate computer, 297, and displayed on the screen along with the interference patterns.

While the patterns may be directed onto a ground glass or other viewing arrangement, rather than the TV camera 275, there are many advantages to be gained by doing so, particularly in industrial situations like the FIG. 6 example where the TV camera cost is relatively negligible and a comparison mode of operation is used in which any non-linearities in the electronics do not matter.

Perhaps the biggest advantage of a TV display is that with simple, well proven, equipment, a 20-50X interference pattern magnification results, with electronically enhanced contrast, and such a display is more readily visible in ordinary industrial situations than is a display of the raw patterns themselves on a ground glass or other screen.

As an example of what is possible with simple equipment, an ordinary Sony Corporation video tape and camera unit normally used for educational purposes was used to detect a single interference pattern produced in a situation just like that of FIG. 6. Using a 1 milliwatt laser source, and impinging the interference pattern directly on the TV camera face, it was observed that an equivalent change in thickness in a plastic sheet of 0.012mm (generated by moving the reference edge with a micrometer) caused the first fringe order to move from one side of the TV screen to the other, a distance in this case of 22cm. The magnification obtained, therefore, was over 18,000, and very little drift of fringe position on the screen was noted with time.

Roll diameters of up to 20cm have been used, and it is noted that the bounce-off system discussed in the referenced application Ser. No. 257,801 can also be used in one of two modes. First, a flat, or slightly curved, plate may form the required reference surface over which the sheet passes relative to the reference edge, or the reference surface may be dispensed with and the sheet gaged on both sides simultaneously relative to two reference edges or other boundaries, one on each side. In this case a subtraction must be made to obtain thickness, requiring a small computer.

Returning to the specific example illustrated in FIG. 6, that of gaging plastic to 0.02mm tolerances or better, it is noted that the main problem in practice is mechanical, namely roll geometry and vibration. Both are eliminated if a fixed cylindrical reference surface is used, providing a sliding contact with the sheet. Wear of the cylinder (which may be provided with a teflon or other low-coefficient of friction coating) can be compensated periodically by adjusting reference edge positions to maintain $w_e$.

When a rolling contact is required in such a high tolerance application, individual high grade bearings can be used at each gaging location. In other words roll 265 need not be a single entity but may be composed of individual precision bearing surfaces opposite the reference edges with dummy rolls of slightly smaller diameter in between.

If vibration, rather than roll straightness is the problem, a capacitance of diffractographic proximity sensor may be used to monitor the position of the roll ends, deriving an electrical signal which is used to correct the TV scan or other electrical output of the detector system used. Where roll straightness is a function of angular position of the roll in its cycle, the light source may be strobed so as to always illuminate a single angular position of the roll surface. Where insuring sheet contact with the roll is a problem, air suction of air blast may be used to form the sheet against the roll.

The optional computer, 297, can also be used to electronically change values displayed, for example, to compensate for roll wear, or in the case of the FIG. 5 apparatus, to generate interference patterns corresponding to the effect of a change in reference edge position. In other words, a pseudo change can be created electronically without physically moving the reference edge, at least over a small range of separations $w$ or $w_e$.

If more computational ability is available, the computer can calculate the width $w$ or $w_e$ from the interference pattern information, subtract this from the initial no sheet width between roll and edge, and therefore cause an actual thickness bar chart to be displayed on the TV screen. When this concept is applied to the apparatus of FIGS. 2–5, actual object contour, approximated of course by the discrete number of positions monitored, can be displaced since the various pin lengths or the reference edge positions can be stored in the computer memory.

Finally, it is noted that in situations where roller 265 deflects as the sheet is tensioned around it, it may be necessary to utilize reference edges 251–254 whose position can be easily adjusted relative to the sheet, for example using electrically actuated piezoelectric expansion elements or the like. This allows the system to be easily re-zeroed "on-line;"

The discussion above has been concerned with apparatus for checking dimensional contours, which represents perhaps the most immediate application for the disclosed invention. It is, however, also possible to determine the distribution of a physical variable in a field using displacements of an array of diffraction wave-producing means caused by action of said variable against an elastic, magnetic, gravitational or other suitable restoring force.

Figure 7:
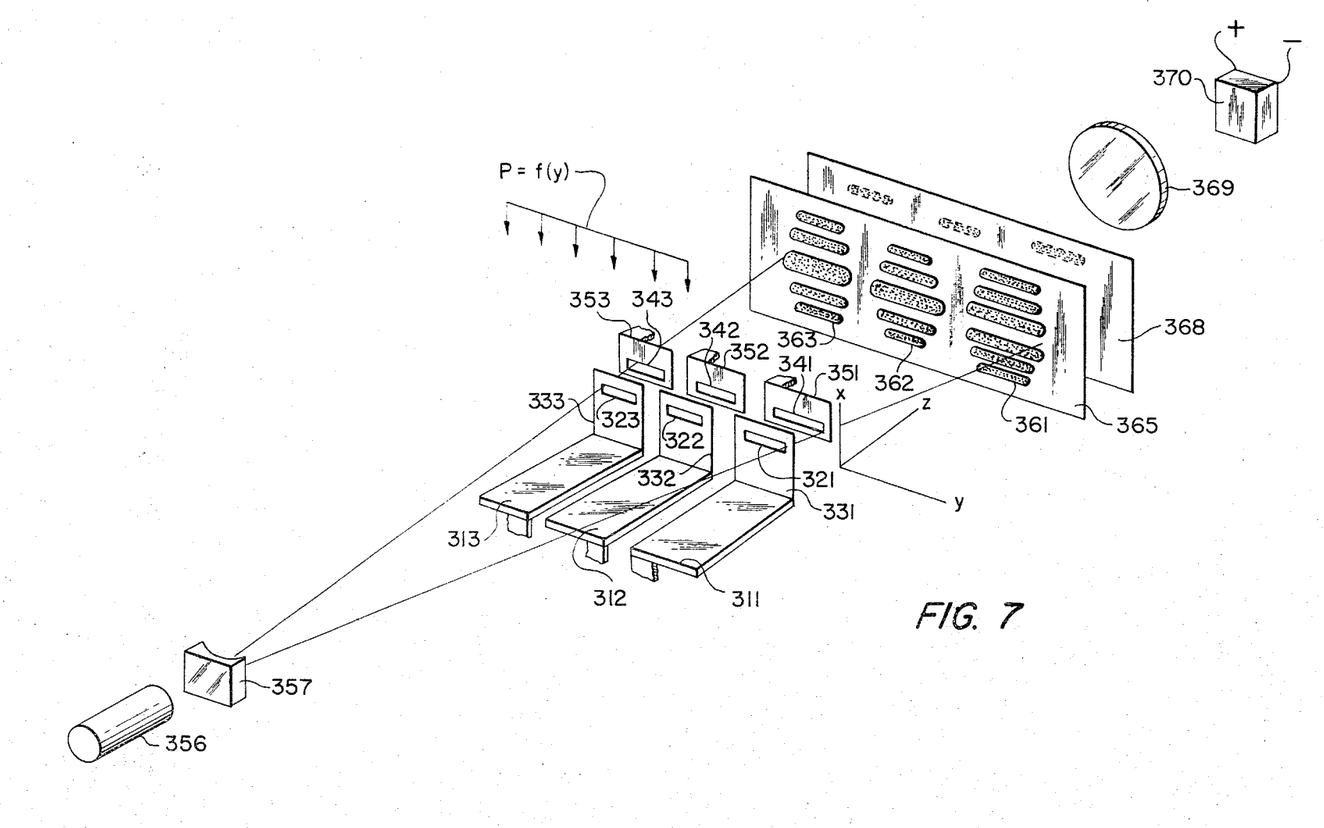
FIG. 7 is a diagrammatic perspective view of an embodiment for sensing the value of a physical variable at a plurality of discrete positions in space.

FIG. 7, for example, illustrates an apparatus used to determine the gas velocity distribution $P = f(y)$ along a line in space. In this instance, cantilever beam elements 311 to 313 are used to provide elastic restoring forces such that the displacement of the diffraction wave producing means in this case comprised of narrow slits 321 to 323 in opaque wall members 331 to 333, are proportional to the magnitude of the velocity field at the location in question. Each diffraction wave producing means includes two boundaries — i.e., the two edges of each slit — spaced in a direction transverse to the direction of the electromagnetic radiation.

Diffraction wave producing means comprising slits 341 to 343 in opaque wall members 351 to 353 are fixed in spaced to provide reference positions from which the deflection of the elastic members can be determined. In this instance members 331 to 333 overlap the corresponding members 351 to 353 such that when the array 355 of diffraction wave producing means is illuminated by waves from gas laser 356 fanned in one dimension by cylinder lens 357, diffraction waves are produced only by the narrow slits, 321 to 323 and 341 to 343.

Just as in previous examples, the diffraction waves interfere to form patterns 361 to 363 on a screen 356 a distance $R >> w$ away, where in this case $w$ is the individual diffraction wave producing means separation at any position. For example, $w$ is the distance between slits 322 and 342, etc. It is noted that equation (1) is $w = (n + 1/2) R \lambda \div x_p$ for this choice of diffraction wave producing means.

With $P = 0$ everywhere, all pairs of opposite diffraction wave producing means are typically chosen to have the same separation $w$, such that their corresponding interference patterns have fringes located on the same positions $x_p$, and equivalently, the same fringe spacings, $s$.

As gas velocity, P, is applied, each elastic element deflects in proportion to the value of P at its location resulting in an immediate representation of the velocity field by fringe spacings or locations of the interference patterns on the screen. Just as in the previous examples, $x_p$ or $s$ can be measured and the distribution of gas velocity determined. If the system has been calibrated, or if the elastic behavior of the sensing elements is known, as is often the case, the magnitude of the velocity at each position may also be determined.

For purposes of illustration, however, another analysis means has been employed, represented by filter 368 placed behind screen 365 said screen being optional. The filter is composed of negative transparencies, on film or otherwise, of interference patterns from each diffraction wave producing means pair, and it is noted that such filtering works best when the type of diffraction wave producing means used is comprised by two finely separated boundaries usually those of a slit in an opaque wall member as shown, or alternatively, for example, the outside edges of a phase or amplitude object such as a fine wire.

The filter may serve two purposes. First, the negative patterns recorded at each position can represent some initial distribution, in which case moire fringes will be observed at each position where the value differs from the initial, with the moire spacing proportional to the difference. Such a filter is of most use in checking tolerances, as in FIG. 2 apparatus, and the filter itself can be considered a master. The moire fringe spacing, S, is given by $$S = s \, s_f/s_f - s$$

(9)

where $s$ and $s_f$ are the actual pattern and filter pattern fringe spacings, respectively.

Another filter application, and that illustrated in FIG. 7, is to allow the presence of a particular distribution to be determined. This is accomplished, in this case, by a detector system comprising spherical lens 369 and photocell 370, which determines the total amount of light passing through the filter from at all discrete interference patterns. A minimum of light, and therefore a "match" is obviously recorded when the filter pattern spacings and those of the individual interference patterns at each position coincide. A suitable detector system may also be comprised by one large photocell the size of the filter, one cell for each individual interference pattern location, etc.

There are many variations and ramifications of the foregoing apparatus which will now be discussed. First, many other variable fields besides gas velocity can be profiled in this manner. For example, a temperature field may be profiled by replacing the simple cantilevers 311 to 313 by bimetal strips, or by simply using the linear coefficient of expansion of a block of material whose edge constitutes the diffraction wave producing means.

Electrostatic and electromagnetic fields may also be profiled by their attraction on elements actuating the difraction wave producing means. In addition, gravitational pressure (i.e., weight) or discontinuous or continuous, amorphous, matter placed on each cantilever element 311 to 313 can be profiled as well. Elements can be membranes or other elastic members too. Restoring forces may also be provided gravitationally by balance arms, magnetically, or otherwise.

A somewhat different situation is sound pressure, which is vibratory in nature. In this case, each element in array 355 vibrates under excitation by a sound field, and such vibratory motion can be profiled at a point in time using stroboscopic illumination as discussed in Ser. No. 253,421. Alternatively, a time-averaged vibrational interference pattern may be generated at each position whose integrated fringe spacing approximates the maximum vibrational amplitude of each element.

An interesting variation occurs when each element of the array, for example cantilever beams 311 to 313 has a different resonant frequency. In this case the array shown may become a spectrum analyzer when placed in a sound pressure field. This is done by adjusting the overlap of members 331 to 333 with 351 to 353, respectively, such that diffraction waves from the diffraction wave producing means cannot reach screen 365 unless greater than a certain separation w, corresponding to a minimum resonant amplitude, is attacined. Thus the profile interference pattern observed on the screen is indicative of the various element resonances excited and the time averaged magnitude of their excitation, above a minimum value (often zero).

The spectrum analyzer just described is actually of a class other than those mentioned previously in that a different variable, in this case a different sound frequency, is represented at each location along the array. Perhaps the most useful example occurs when the change in separation of each pair of diffraction wave producing means is a function of an electrical variable, for example a voltage causing a piezoelectric bimorph element similar to the cantilevers 311–313 to deflect. The voltage may be generated in proportion to a wide variety of variables by known means, yielding a virtually unlimited choice of variable relationships which can be displayed using the invention.

It is now of interest to consider some uses for the filter matching detection apparatus shown in FIG. 7 with such electrical inputs. A good example is in optical character reading, where each photodetector in a character sensing head matrix generates a voltage in proportion to the amount of print in its particular location. In a 10 × 10 detector matrix each could feed, after suitable amplification, one of 100 of the bimorph elements just described, positioned in a line array in accordance with the invention. Filters representing different character possibilities would then be placed in sequence, or simultaneously with a suitable optical arrangement, the two dimensional interference pattern, with a match detected by photodetector 370 indicating the correct character.

If based on galvonometer type, piezoelectric or other electromechanical elements used to change w, the recognition speed of such a system is limited by the $\Delta w$ rate to approximately 1KHZ, in other words 1,000 characters a second in the above system. This is a creditable performance, especially considering the ease with which the character set master (i.e., the filters) may be changed, and the fact that it is at least five gray levels at each detector which are recognized, and converted to corresponding w values.

Use of pure electronic, or faster electromechanical apparatus to change the relative separation of suitable phase or amplitude diffracting boundaries, and therefore w, would allow faster input of character information (w values).

It is noted that both diffraction wave producing means in any pair may be actuated, rather than just one, relative to a fixed reference means. This allows an interference pattern to be generated whose fringe spacing is a function of $\delta_1 + \delta_2$, where 1 and 2 are the signals driving the two actuating elements, such as the bimorphs mentioned above. In other words, addition or subtraction may be performed using the system shown in FIG. 7 since by interchanging the filters to fing a "match" one is finding an answer to the addition problem. Similarly, if the elements move logarithmically in response to input signal values, and the filters represent patterns corresponding to the anti-log, then multiplication or division can be performed.

The linear array of parallel interference patterns from individual sensing elements illustrated in the figures above constitutes the usual embodiment of the invention. However, the invention also encompasses those variations with non-parallel discrete interference patterns as well.

Figure 8:
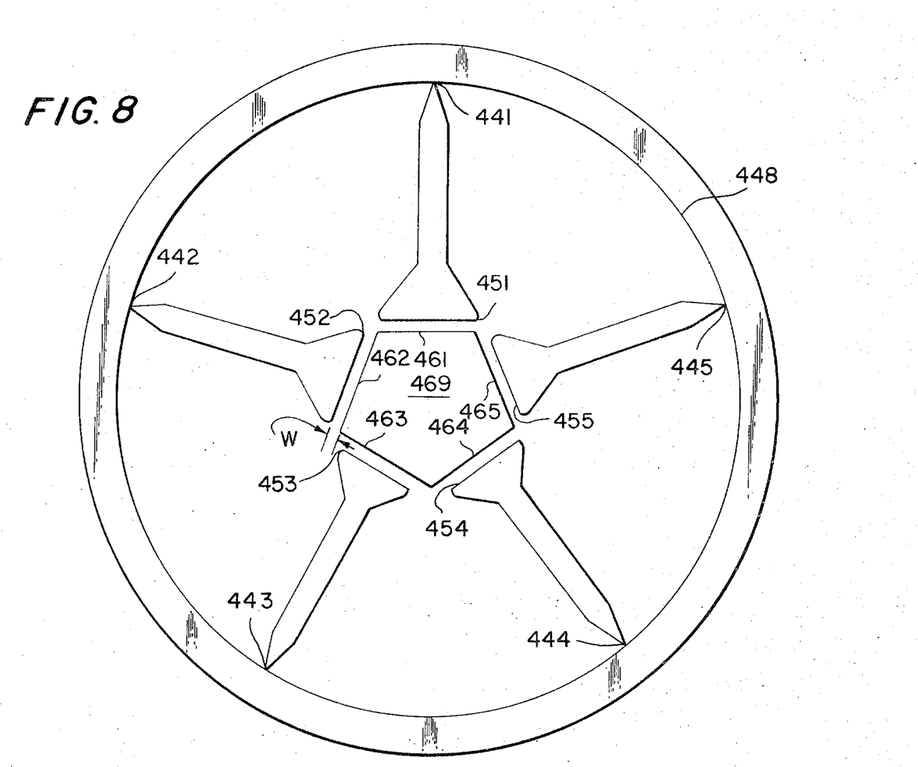
FIG. 8 is a diagrammatic end view of an embodiment of the invention suitable for gaging the inside bore of a cylinder and other cavities.

For example, consider in FIG. 8 the array of sensing elements 430 formed by pin members whose ends 441 to 445 contact the inside bore of a cylinder, 448, and whose perpendicular edges 451 to 455 are located parallel and opposite to edges 461 to 465 of polygon-shaped reference edge member 469. The interference fringe patterns generated when the diffracting edges of such an array are illuminated extend radially and in the direction of the corresponding pins with the fringe positions indicative of the bore shape. If no reference edge is parallel to another reference edge, then no pattern will overlap another, a desirable feature. This condition is achieved in the FIG. 8 example by utilizing a pentagon-shaped reference member which in addition, allows all patterns to pass through the bore centerline. In those cases where overlap does occur, opaque masks can be used to block out the portion of each pattern causing the overlap.

The FIG. 8 device, particularly when the polygon is an equilateral triangle, can also be used to find a bore center, a condition indicated when all patterns have the same fringe spacing (when pin lengths are identical).

Figure 9:
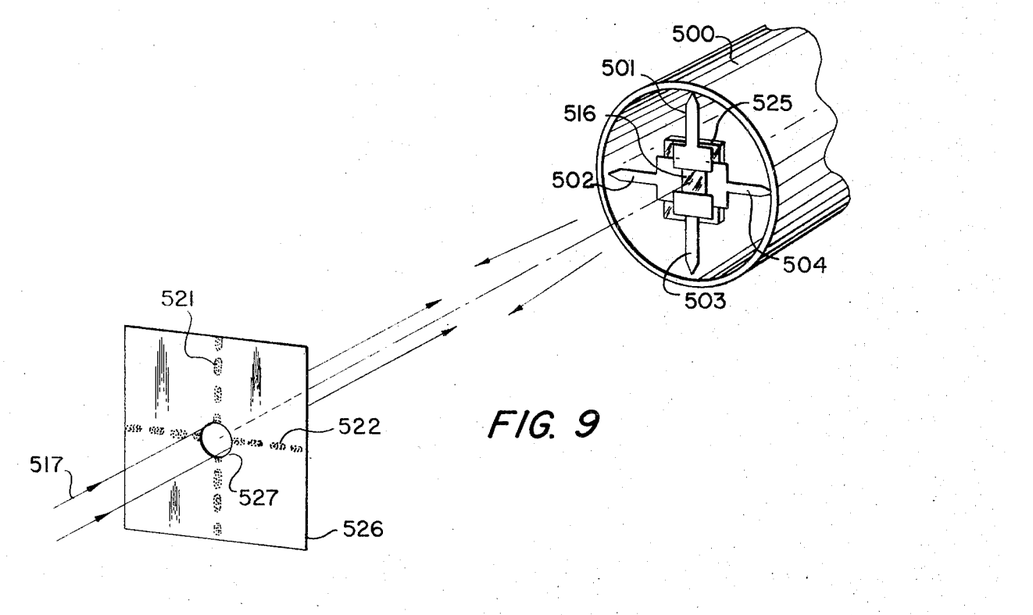
FIG. 9 is a diagrammatic perspective view of an embodiment of the invention capable of determining inside diameter at a multiplicity of radial positions.

It is also possible to use the invention to check diameter directly, using a single interference pattern. FIG. 9 illustrates the apparatus, which obtains diameter along two orthogonal axes simultaneously.

As shown, object bore 500 is contacted at four positions 90° apart by spring loaded pin members 501 to 504, each of which has an edge 511 to 514 opposite the point of contact and parallel to the opposite pin edge. The rectangular aperture thus formed, 516, is irradiated by a laser beam 517 forming a cross shaped array of two orthogonal diffraction wave interference patterns 521 and 522 whose fringe positions are a function only of the separation between the corresponding set of opposite edges. In this example, a mirror 525 located directly behind the edges has been employed to direct the patterns onto ground glass viewing screen 526 containing a small hole 527 for the laser beam to pass through. Use of the mirror, allows checking of cylinders or other bores with a closed end, and can be dispensed with when open-ended bores are gaged.

As the pin array is moved down the bore, changes in fringe position give the bore diameter at two orthogonal locations. With some added complexity, three diameters (six pins, hexagonal aperture) or even four (eight pins, octagonal aperture) can be gaged. Alternatively, a simple one diameter two pin device can be rotated about the bore axis (which need be only approximate) as is done with many present types of electronic or dial type bore gages.

While illustrated as a bore gage, the FIG. 9 apparatus concept wherein both pins (whose edges diffract waves to form an interference pattern) contact a surface of the tested object can be used in linear fashion as in the FIG. 2 example. This would be of considerable use in checking the internal width of microwave waveguide, extruded box section stock, or the like. Similarly, the reflective mirror system can be used with any of the embodiments as well.

While most of the applications envisioned for the invention described in the drawings above would utilize sensing locations in close adjacency, this is not a requirement. It is only required that the patterns from each sensor location be optionally directed so as to form any array of patterns which can be easily visualized or observed by a unitary detection system, such as a TV camera, human eye, or filter-detector combination. Thus, sensing locations, could be meters apart for example, as in seismic work, or sonar with each individual pattern directed by means of wedges lenses gratings, mirrors, fiber optics or other optical elements to a central viewing station where the relative sensed values could be ascertained.

It is also recognized that interference patterns from each sensor location need not be viewed immediately as they are generated. For example, photographic film may be used to store a pattern produced at a given location for future comparison with patterns from other locations.

Finally, it is noted again that all detection means described in application Ser. Nos. 253,421 and 256,099 can be used in this invention, with particular emphasis on those producing a quasi-digital count proportional to a change in separation of two opposite diffraction wave producing means.

I claim:

1. A method of analyzing the spatial separation relationship of a plurality of first points relative to a plurality of second points spaced therefrom, each of said second points being spaced from a corresponding one of said first points comprising:

providing a plurality of first, discrete, diffraction wave producing means to establish said plurality of first points;

providing at least one second diffraction wave producing means spaced from said plurality of first diffraction wave producing means to establish said plurality of second points spaced from said first points;

directing electromagnetic radiation at the first and second diffraction wave producing means to form a plurality of discrete interference patterns each caused by the interaction of waves produced from one of said first diffraction wave producing means forming one of said first points and from said second diffraction wave producing means forming said second point spaced from said one first point, said second diffraction wave producing means comprising a single boundary or two or more single boundaries separated in a direction transverse to the direction of said electromagnetic radiation, each of said single boundaries being capable of producing a single diffraction wave upon incidence thereon of said electromagnetic radiation; and directing at least a portion of each of the plurality of discrete interference patterns formed to a central location for analysis.

2. A method according to claim 1 wherein said plurality of first diffraction wave producing means comprises a plurality of members mounted in a common housing.

3. A method according to claim 1 wherein the spatial relation of said second points relative to each other is known.

4. A method according to claim 1 wherein said second diffraction wave producing means comprise a single member, said second points comprising portions of said single member.

5. A method according to claim 4 wherein said second diffraction wave producing means comprises the surface of a sheet material.

6. A method according to claim 5 wherein said sheet material is moving.

7. A method according to claim 5 wherein said surface is tangent to the direction of said electromagnetic radiation.

8. A method according to claim 1 further including the step of comparing said discrete interference patterns with one another.

9. A method according to claim 1 further including the step of comparing at least a portion of each of said discrete interference patterns with a reference position for said portion, said reference position corresponding to a known separation of said first and second diffraction wave producing means.

10. A method according to claim 9 wherein said reference position comprises at least a portion of a reference interference pattern corresponding to a known separation of said first and second diffraction wave producing means.

11. A method according to claim 1 wherein at least one of said first and second diffraction wave producing means is integral with a member subject to movement under the influence of a force applied to said member.

12. A method according to claim 1 wherein at least one of said first and second diffraction wave producing means comprises at least two boundaries spaced in a direction transverse to the direction of said electromagnetic radiation.

13. A method according to claim 12 wherein said first and second diffraction wave producing means each comprise a slit having two boundaries.

14. A method according to claim 12 wherein said first and second diffraction wave producing means each comprise a diffraction grating.

15. Apparatus for analyzing the spatial separation relationship of a plurality of first points relative to a plurality of second points spaced therefrom, each of said second points being spaced from a corresponding one of said first points comprising:

a plurality of first, discrete, diffraction wave producing means for establishing said plurality of first points;

at least one second diffraction wave producing means spaced from said plurality of first diffraction wave producing means for establishing said plurality of second points spaced from said first point; said second diffraction wave producing means each being independently positionable relative to a corresponding one of said first diffraction wave producing means;

means for directing electromagnetic radiation at said first and second diffraction wave producing means for forming a plurality of discrete interference patterns each caused by the interaction of waves produced from one of said first diffraction wave producing means forming one of said first points and from said second diffraction wave producing means forming said second point spaced from said one first point, said second diffraction wave producing means comprising a single boundary or two or more single boundaries separated in a direction transverse to the direction of said electromagnetic radiation, each of said single boundaries being capable of producing a single diffraction wave upon incidence thereon of said electromagnetic radiation; and means for directing at least a portion of each of the plurality of discrete interference patterns formed to a central location for analysis.

16. Apparatus according to claim 15 wherein said plurality of first diffraction wave producing means comprises a plurality of members mounted in a common housing.

17. Apparatus according to claim 15 wherein the spatial relation of said second points relative to each other is known.

18. Apparatus according to claim 15 wherein said second diffraction wave producing means comprises a single member, said second points comprising portions of said single member.

19. Apparatus according to claim 17 wherein said second diffraction wave producing means comprises a surface of a sheet material.

20. Apparatus according to claim 19 further including means for moving said sheet material.

21. Apparatus according to claim 15 wherein at least one of said first and second diffraction wave producing means is integral with a member subject to movement under the influence of a force applied to said member.

22. Apparatus according to claim 15 wherein at least one of said first and second diffraction wave producing means comprises at least two boundaries spaced in a direction transverse to the direction of said electromagnetic radiation.

23. Apparatus according to claim 22 wherein said first and second diffraction wave producing means each comprise a slit having two boundaries.

24. Apparatus according to claim 22 wherein said first and second diffraction wave producing means each comprise a diffraction grating.

* * * * *